April 30, 1946.  E. W. DAVIS  2,399,171
LUBRICATING APPARATUS
Filed April 7, 1943
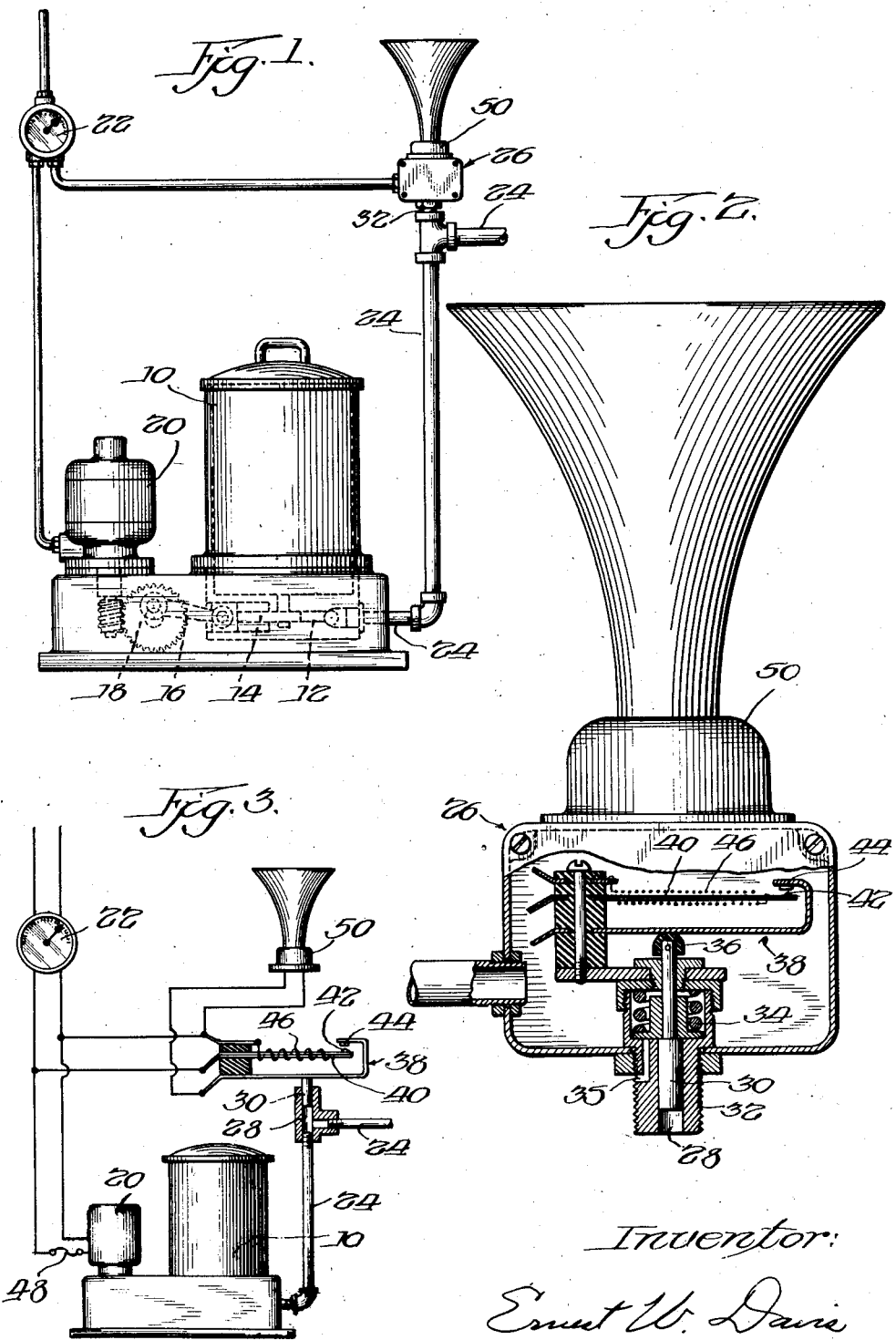
Inventor:
Ernest W. Davis Patented Apr. 30, 1946

2,399,171

UNITED STATES PATENT OFFICE 2,399,171

LUBRICATING APPARATUS

Ernest W. Davis, River Forest, Ill.

Application April 7, 1943, Serial No. 482,145

4 Claims. (Cl. 177—311)

My invention concerns pumps for pumping fluid or semi-fluid substances, and relates particularly to pumps which are automatically controlled for intermittently pumping predetermined quantities of lubricant at regularly recurring time intervals into a lubricant conduit leading to a plurality of flow-regulating devices for proportioning the flow of said lubricant to a plurality of bearings requiring lubrication.

Automatic pumps of this class have supplanted hand operated pumps to some extent for the purpose described, because they avoid the necessity of manual effort, and to that extent they are an advance in the art. But they have a serious, inherent disadvantage, which may more than offset the advantage described. Owing to the characteristic absence of personal supervision during the operation of an automatic pump, a general disorder affecting the entire lubricating system can pass unnoticed, until serious and extensive damage has been done, because a pump of this class is subjected to many adverse conditions, any one of which can result in loss of pressure, and consequent failure of the entire lubricating system.

The general object of this invention is to provide an automatic pump which retains prior advantages, and which eliminates the possibility of an unnoticed general disorder. Such a general disorder may result from any one of a number of causes, such as depletion of the lubricant supply in the pump, a short circuit or open circuit in the motor for driving the pump, a broken or disordered part in the pumping mechanism, the inclusion of dirt or excessive amounts of air in the lubricant loaded into the pump, loading the pump with cold lubricant too soon after removal from an unheated storage room and too stiff for satisfactory priming in the pump, a worn out check valve or seat, a break or leak in the lubricant conduit, etc.

A more specific object of this invention is to provide means for actuating an audible alarm device in case any one of the above named adverse conditions should prevent normal operation of the lubricating system. Such an alarm immediately notifies any one within hearing distance of any such disorder, and the disorder can then be corrected before any damage is done.

A further object is to provide an alarm device of the class described which is simple in construction and dependable in operation, and which can be manufactured at low cost. These and other objects will appear as the description proceeds.

In the drawing:

Figure 1 is an elevation of a lubricant pump for delivering lubricant under pressure to a lubricant line;

Figure 2 is a part sectional elevation of the alarm device; and

Figure 3 is a wiring diagram.

The lubricant pump comprises a lubricant reservoir 10, a high pressure cylinder 12, containing a reciprocating plunger 14, driven by the connecting rod 16, worm gear 18, and motor 20. The motor 20 is supplied with current at regularly recurring time intervals of predetermined duration, by the time switch 22, which is a standard article of manufacture.

Lubricant delivered under pressure from the high pressure cylinder 12, passes into the discharge conduit 24, which delivers the lubricant to suitable measuring devices (not shown), many of which are disclosed in the prior art, and these measuring devices proportion the amounts of lubricant discharged into a plurality of bearings requiring lubrication.

The alarm device 26, Figure 2, comprises a lubricant cylinder 28, containing a sliding piston 30, which is lapped to a close fit in the cylinder 28. The cylinder 28 is provided with external screw threads 32, for attaching the alarm device in the discharge conduit 24. The piston 30 is urged upwardly by the lubricant pressure in the cylinder 28, and is urged downwardly by the compression spring 34. The vent opening 35 permits escape of the little lubricant that might bypass the piston 30.

The insulating cap 36 is moved upwardly by the lubricant pressure in the cylinder 28, to flex the contact spring 38 in an upward direction for a purpose which will be described hereinafter. The bimetal contact spring 40 is provided with a contact 42, which normally is slightly separated from the contact 44, carried by the contact spring 38. The bimetal contact spring 40 is provided with a heating element 46, which is supplied with current by the time switch 22, as shown in Figure 3. The motor fuse 48 is located close to the motor 20 for a specific purpose, which will be described hereinafter. The electric horn 50 is connected across the heating element 46 and the contact spring 38, as shown.

The operation of the signal device 26 will now be described. When the time switch 22 supplies current to the motor 20, current is also supplied to the heating element 46 thereby causing the contact 42 to approach the contact 44. But meanwhile the operation of the motor 20 produces lubricant pressure in the discharge conduit 24 and in the cylinder 28, whereby the contact 44 is moved away from the contact 42, so that the contact 42 cannot make contact with the contact 44. However, if lubricant pressure is not built up in the conduit 24, due to any one of the adverse conditions hereinbefore described, then the contact 44 will remain stationary, the contact 42 will move upwardly and make contact with the contact 44, and the electric horn 40 will sound a warning alarm, so that those in attendance can correct the trouble before any damage is done.

The duration of the supply of current, as determined by the time switch 22, is sufficient to allow the contact 42 to make contact with the contact 44 if the contact 44 is not moved upwardly, but the duration of the supply of current is not sufficient to complete the circuit when the contact 44 is moved upwardly by the influence of normal working pressure in the discharge conduit 24.

Due to the location of the motor fuse 48 in close proximity to the motor 20, a short circuit in the motor 20 will blow the fuse 48, but will not affect the shunted circuit leading to the alarm device, so that the alarm device may then sound a warning alarm, indicating that the lubricating system is not functioning.

Without further elaboration the foregoing will so fully explain my invention that others may, by applying knowledge current at the time of application, readily adapt the same for use under various conditions of service.

I claim:

1. In lubricating apparatus, means for intermittently closing an electric circuit at regularly recurring time intervals; an electric motor in said circuit; a lubricant pump driven by said electric motor; a discharge conduit for said lubricant pump; an electrically actuated alarm device; a bimetal switch having a movable contact; an electric heater for heating said bimetal, said heater being connected in said circuit so as to be in parallel with said motor; a resilient member; a second movable contact carried by said resilient member; and a pressure responsive element responsive to an adequate working pressure in said discharge conduit for causing movement of said resilient member, and the movement of said bimetal when heated by said heater being in a direction to move said first contact towards said second contact, and said movement of said resilient member being in a direction to move said second contact away from said first contact, for the purpose set forth.

2. In lubricating apparatus, means for intermittently completing an electric circuit at regularly recurring time intervals; an electric motor in said circuit; a lubricant pump driven by said electric motor; a discharge conduit for said lubricant pump; an electrically actuated alarm device; a bimetal switch for connecting said alarm device in said circuit in parallel with said motor when said bimetal is heated; an electric heater for heating said bimetal, said heater being connected in said circuit in parallel with said motor; and means responsive to an adequate working pressure in said conduit for preventing said switch from closing.

3. In lubricating apparatus, a timing mechanism, an electric switch controlled by said timing mechanism; an electric motor controlled by said switch; a lubricant pump driven by said motor; a lubricant discharge conduit for said lubricant pump; a second timing mechanism, said second timing mechanism being electrically actuated, and controlled by said switch; a second switch, said second switch being actuated by said second timing mechanism, and said second timing mechanism being timed to close said second switch an appreciable time after the closing of said first switch; an electric alarm device controlled by said second switch; and means responsive to a normal working pressure in said lubricant conduit for preventing the closing of said second switch.

4. In lubricating apparatus, a timing mechanism, an electric switch controlled by said timing mechanism; an electric motor connected in an electric circuit controlled by said switch; a lubricant pump driven by said electric motor; a lubricant discharge conduit for said lubricant pump; a delayed action relay switch connected in said motor circuit; an electric alarm device controlled by said relay switch; and means responsive to a normal working pressure in said lubricant conduit for preventing the closing of said relay switch.

ERNEST W. DAVIS.